Patented Feb. 2, 1926.

1,571,873

UNITED STATES PATENT OFFICE.

THOMAS BLACKADDER, OF GREAT NECK ESTATES, NEW YORK, ASSIGNOR TO ROBESON PROCESS COMPANY, OF NEW YORK, N. Y., A CORPORATION OF NEW JERSEY.

PROCESS OF MAKING TANNING PREPARATIONS AND PRODUCTS THEREOF.

No Drawing.   Application filed June 10, 1924. Serial No. 719,191.

*To all whom it may concern:*

Be it known that I, THOMAS BLACKADDER, a citizen of the United States, residing at Great Neck Estates, in the county of Nassau and State of New York, have invented certain new and useful Improvements in Processes of Making Tanning Preparations and Products Thereof, of which the following is a specification.

This invention relates to processes of making tanning preparations and products thereof; and it comprises a method of making a tanning material of high purity from sulfite waste liquor, wherein such sulfite waste liquor is treated with an amount of caustic lime greater than that necessary to neutralize and sufficient to precipitate a certain amount of soluble non-tans existing in such liquor, is separated from the precipitate thereby formed, is concentrated to a desirable density and is freed from lime by sulfuric acid or another acid; and it also comprises as a new tanning agent, a concentrated liquid containing acid constituents of sulfite waste liquor, having a reduced ash content and having a purity in excess of 60; that is, having more than 60 per cent of the total solids present of a tannin character; all as more fully hereinafter set forth and as claimed.

Excellent tanning and hide treating preparations can be made from sulfite waste liquor in sundry ways and a number of these have become of commercial importance. Their purity, however, as a rule is not greater than about 50; by "purity" meaning the percentage of the total solid matter present which can be absorbed or taken up by hide substances. For tanning purposes, it is highly desirable to have a preparation of somewhat greater purity. Further, most of the preparations which have been made technically have contained considerable amounts of ash constituents; bases in combination with the acid bodies of the liquor. For many tanning purposes, it is desirable to have a low content of mineral matter in the extract. In use in tanning, as tans are extracted by the hide substance, the non-tans build up in the bath. And it is also desirable to have a tanning preparation of fairly acid character, provided the acidity is not due to sulfuric acid or other mineral acid. A high content of "lignosulfonic acids" in a free state is particularly desirable. While the exact nature of the bodies contained in sulfite waste liquor and having tanning properties is not known, yet for convenience they are called lignosulfonic acids and are usually regarded as being derived from the acid sulfites contained in the original sulfite liquor, the sulfurous radical having gone into organic combination with organic bodies derived from the "lignone" portion of the wood. In the original sulfite waste liquor, these lignosulfonic acids exist in combination with the bases of the sulfite liquor—usually lime and magnesia. The sulfite waste liquor also contains various other organic acids, not of a tanning nature, in a free or combined state. Acetic acid or acetates are usually present in substantial amounts. There are also other bodies in solution which have no tanning effect and are not taken up by hide; these being generally called non-tans.

I have found that by a certain method of operation I can produce acid tanning preparations from sulfite waste liquor of highly desirable properties for many purposes and of a purer nature than those heretofore made; in particular containing a markedly less proportion of non-tans. Their "coefficient of purity" is often substantially greater than 60 and the ash content is often one per cent or less. Because of the greater purity, it is possible to produce liquors or "extracts" containing the standard 22 to 25 per cent tans of a less concentration than the usual 30° Baumé liquor necessary to obtain such a content. Liquors of a density as low as 20–22° Baumé often suffice.

In the present invention, I first treat the light liquor coming from the digesters with a substantial amount of caustic lime, usually added as milk of lime, and added with vigorous agitation. This lime should be calcite lime; i. e., free, or substantially free, of magnesia. While the light liquor varies considerably in strength, according to the amount of washings which are mingled with the real digester liquor, it is usually assumed that on the average it requires about 0.5 per cent lime for neutralization. In the present invention, I use a greater proportion of lime, ranging from 1.25 to 2 per cent with a liquor requiring 0.5 per cent for neutralization. Enough lime is added to make the mixture of lime and liquor distinctly alkaline to litmus paper. The proportions stated I regard as safe limits. The addition of lime may be made with the liquor cold or warm; the latter being preferable. With lime added to the cold liquor in the amounts stated, there is formed a precipitate which is more or less gelatinous and hard to handle, while with the liquor at a temperature of 130° F., or higher, there is a precipitate which is more curdy and is easier to handle. After development of the precipitate it is removed by settling or filtering, giving a clarified liquor.

An excess of lime in the proportion stated seems to have several functions here useful. One is the removal of a certain amount of non-tans, another is the precipitation of magnesia and a third is the development of what I may call "latent acidity." On concentrating the clarified liquor and removing lime with an acid, a more acid liquor is produced than is obtained with a liquid merely neutralized but otherwise receiving the same treatment.

While, as stated, I add more lime than is required to neutralize, the clarified liquor separated from the precipitate is not particularly alkaline; the excess of lime added being mostly represented in the precipitate. Apparently, it has gone down in combination with organic matters, mostly of a non-tan character. Where the light liquor, as is usually the case, contains magnesia, much or most of this goes down with the precipitate; lime taking its place in combination with the dissolved acid bodies of the liquor. The liquid is, as stated, separated from the precipitate by settling, filtration, or in any other convenient way, and is then evaporated in the usual ways, as by evaporation in vacuo or in a multiple effect. It may be evaporated to 30° Baumé or to any less strength desired. As stated, the clarified liquor is not particularly alkaline and its evaporation offers no difficulties.

In the concentrated liquor practically all the base existing in combination with the organic acids is lime, magnesia having been displaced (completely or for the most part) in the initial precipitation. On adding the calculated amount of sulfuric acid (or oxalic acid), the lime can be completely removed, carrying down with it, of course, the added sulfuric acid as calcium sulfate. The resulting liquid contains no sulfuric acid and is free from bases, or substantially so. Usually with an 18° Baumé liquor, the total ash is not more than 1 per cent. It usually contains a per cent or so of free acetic acid which may or may not be removed. Sometimes its presence is desirable in a tanning preparation; sometimes not. The valuable acid content of the liquor is, of course, the lignosulfonic acids; and the acetic acid is of less importance. Where the amount of acetic acid present is deemed undesirably large, much or most of it may be removed by air blowing the preparation at, say, 50° C. (122° F.), or by distilling the liquid at a low temperature with an immiscible volatile liquid, such as gasoline or benzol. Distillation with suitable apparatus may be so effected as to return benzol, etc., to the liquid continuously, thereby rendering possible economical operation.

In a typical embodiment of the present invention, the light liquor available contained about 10 per cent solids and as tested by phenolphthalein, required 0.5 per cent caustic lime for neutralization. This amount of lime added to the liquid gave no precipitate; the liquid remaining clear. To the liquid, I added 1.25 per cent of good, thoroughly burnt calcite lime, substantially free of magnesia; the addition being in the form of milk of lime. The temperature of the liquid at the time of addition was 160°–170° F. The addition of milk of lime was thoroughly stirred in and resulted in the formation of a curdy sludge or precipitate, settling rapidly and compactly. Lime added in the same proportion to the same liquid at the ordinary temperature gave a precipitate or sludge which was not so easy to handle; but the results were otherwise the same. The clear liquid was concentrated in vacuo to about 1.25 specific gravity or 29° Baumé, cooled and sulfuric acid of 60 per cent stirred in under conditions precluding any local excess. The amount of acid was that required to form sulfate of lime (calcium sulfate) by the lime present; that is, the addition was so made as to leave neither lime nor sulfuric acid in the liquor. The addition of sulfuric acid in this way reduced the specific gravity somewhat; partly because of the water in the acid and partly because of the removal of solid material (lime) from the solution. After the addition of the acid, the liquid was separated from the precipitated sulfate of lime by filtering. Its specific gravity was about 1.1707, or about 21.1° Baumé; and it contained 36.11 per cent of total solids of which 22.49 were tanning bodies—a purity of 62.3. On evaporation to dryness, the residues was water soluble. This preparation showed an acidity of 6.36 per cent calculated as acetic acid. By air blowing for a time, much of the actual acetic acid could be removed. The acid so removed was recovered by scrubbing the effluent air with milk of lime. The lime present in the liquor was 0.29. This particular preparation was made from a sulfite liquor high in magnesia and contained 1.01 per cent magnesia. By raising the amount of lime added to the light liquor in the first step of the process from 1.25 to 2 per cent, the magnesia in the preparation just described was reduced to 0.28 and the total ash to 1 per cent. The acidity was raised to 8.4 per cent. By using the lower proportion of excess lime indicated (that is, 0.75 per cent) over the 0.5 per cent required for neutralization, the magnesia in the final preparation is somewhat higher with the liquor made with dolomitic lime in the first place; but the amount of acid necessary for precipitation is somewhat reduced.

Although the liquor made as just described was but 21.1° Baumé, it carried the same amount of tanning constituents, namely 22 per cent, as an ordinary 30° Baumé commercial tanning preparation carrying 50 per cent total solids. Because of the comparatively low Baumé of the product carrying 22 per cent tanning bodies, the yield, calculated on the original light liquor, is of course greater than in making the usual 30° Baumé preparations with the same amount of tanning constituents. In this particular case, the yield was about 15 per cent by volume calculated on the original light liquor; 6.66 gallons of light liquor giving one gallon of the new preparation.

Because of the less concentration necessary, there is a marked saving in evaporation costs.

While I have particularly described the manufacture of the new tanning preparation from light liquors containing magnesia, the procedure is of course equally applicable to light liquors free from magnesia; and there are some advantages in using such light liquors. Ordinarily, the sulfite liquor used in digesting wood to make pulp is prepared with the aid of dolomitic limestone carrying varying quantities of magnesia; and this magnesia appears in the sulfite waste liquor resulting from the digestion. But the original sulfite liquor can be made from a calcite lime, free or substantially free of magnesia and in this event, the waste liquor does not carry magnesia. With such a liquor, the lime added in the first step of the present operation has no magnesia-removing function; and it is not necessary to use so large an excess of lime in preparing a low-ash preparation.

What I claim is:—

1. The process of making a tanning preparation from waste sulfite liquor which comprises treating digester liquor with slightly more lime than is required to neutralize, separating the precipitate thus produced, concentrating the liquid and adding thereto the amount of sulfuric acid required to precipitate the lime in solution.

2. The process of making a tanning preparation from waste sulfite liquor which comprises treating digester liquor with slightly more lime than is required to neutralize, the proportion with a liquor requiring 0.5 per cent for neutralization ranging between 1.25 per cent and 2 per cent, separating the precipitate thus produced, concentrating the liquid and adding thereto the amount of sulfuric acid required to precipitate the lime in solution.

3. As a new low ash tanning composition, a concentrated sulfite waste liquor substantially free of mineral acids and lime and other bases and having a purity not less than 60; that is, having more than 60 per cent of the total solids present of a tanning character.

In testimony whereof, I have hereunto affixed my signature.

THOMAS BLACKADDER.